US012782227B2

(12) United States Patent
Kim

(10) Patent No.: US 12,782,227 B2
(45) Date of Patent: Nov. 3, 2026

(54) LEAKAGE DETECTING DEVICE OF HYDROGEN STORING SYSTEM

(71) Applicants: Hyundai Motor Company, Seoul (KR); Kia Corporation, Seoul (KR)

(72) Inventor: Gyeong Jun Kim, Wonju-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 249 days.

(21) Appl. No.: 18/679,978

(22) Filed: May 31, 2024

(65) Prior Publication Data

US 2025/0198877 A1 Jun. 19, 2025

(30) Foreign Application Priority Data

Dec. 13, 2023 (KR) ........................ 10-2023-0181275

(51) Int. Cl.
*G01M 3/32* (2006.01)
*F17C 13/02* (2006.01)

(52) U.S. Cl.
CPC ......... *G01M 3/3209* (2013.01); *F17C 13/025* (2013.01); *F17C 13/026* (2013.01); *F17C 2205/0134* (2013.01); *F17C 2205/0323* (2013.01); *F17C 2221/012* (2013.01); *F17C 2250/043* (2013.01); *F17C 2250/0439* (2013.01); *F17C 2250/0694* (2013.01); *F17C 2260/038* (2013.01); *F17C 2270/0168* (2013.01); *F17C 2270/0184* (2013.01)

(58) Field of Classification Search
CPC ..................................................... G01M 3/329
See application file for complete search history.

(56) References Cited

U.S. PATENT DOCUMENTS 7,127,937 B1 10/2006 Thyroff
7,870,878 B2 1/2011 Zhevago et al.
8,621,913 B2 1/2014 Jaeger
2005/0160794 A1* 7/2005 Sonntag .................. G01M 3/10 73/40
2008/0016951 A1* 1/2008 Lehmann .............. G01M 3/329 73/40
2014/0174159 A1 6/2014 Kim
2016/0116364 A1* 4/2016 Vaccaro ................ G01M 3/229 73/40.7
2019/0063686 A1* 2/2019 Ogiwara ............. G01M 3/2815
(Continued)

FOREIGN PATENT DOCUMENTS

CN 105784297 A 7/2016
CN 108679437 A 10/2018
(Continued)

*Primary Examiner* — Alexander A Mercado
(74) *Attorney, Agent, or Firm* — Slater Matsil, LLP

(57) ABSTRACT

An embodiment device for detecting a leak in a hydrogen storing system includes a case having an accommodation space defined therein, wherein the accommodation space is configured to accommodate a plurality of storage tanks and a component part therein, the component part including a component configured to fill a fuel into the plurality of storage tanks or supply the fuel to a fuel consumer, and a sensor part disposed in the case, the sensor part including a pressure sensor configured to measure a pressure of a fluid inside the accommodation space and a temperature sensor configured to detect a temperature of the fluid.

17 Claims, 3 Drawing Sheets

(56) References Cited

U.S. PATENT DOCUMENTS

| | | | | |
|---|---|---|---|---|
| 2021/0278048 | A1 | 9/2021 | Kanezaki et al. | |
| 2022/0299167 | A1 | 9/2022 | Gallandat | |
| 2023/0187666 | A1 * | 6/2023 | Choi | H01M 8/04425 429/429 |
| 2023/0253632 | A1 * | 8/2023 | Cohen | H01M 10/4285 429/9 |
| 2026/0056084 | A1 * | 2/2026 | Xue | G01M 3/2876 |

FOREIGN PATENT DOCUMENTS

| | | | |
|---|---|---|---|
| DE | 112012001789 | T5 | 1/2014 |
| JP | 2021139478 | A | 9/2021 |
| KR | 101340314 | B1 | 12/2013 |
| KR | 101353906 | B1 | 1/2014 |
| WO | 2023025657 | A1 | 3/2023 |

* cited by examiner

LEAKAGE DETECTING DEVICE OF HYDROGEN STORING SYSTEM

CROSS-REFERENCE TO RELATED APPLICATIONS

This application claims the benefit of Korean Patent Application No. 10-2023-0181275, filed on Dec. 13, 2023, which application is hereby incorporated herein by reference.

TECHNICAL FIELD

The present disclosure relates to a leakage detecting device of a hydrogen storing system.

BACKGROUND

In vehicles that use compressed natural gas or compressed hydrogen gas, pressure-resistant containers that store gas or hydrogen are attached to the vehicles. The pressure-resistant containers may be easily corroded depending on operation of the vehicle, and thus whether the pressure-resistant containers are corroded and the stability of the pressure-resistant containers should be checked regularly. Further, gas leakage accidents frequently occur in high-pressure components such as discharge valves and high-pressure pipes of the pressure-resistant containers.

A method of determining hydrogen gas leakage in a vehicle according to the related art includes a passing inspection of the pressure-resistant container and a leakage inspection of the high-pressure component. The passing inspection of the pressure-resistant container according to the related art is performed inside a sealed chamber after a single pressure-resistant container is put into the chamber. According to this method, in the case of the pressure-resistant container mounted on the vehicle, since accurate inspection may be performed only when the pressure-resistant container is disassembled and put into a separate chamber, the procedure is cumbersome, and thus, the inspection is frequently performed in a simplified manner.

Further, in the case of a leakage inspection of a high-pressure component according to the related art, in many cases, only a large-scale leakage is mainly inspected or the inspection is performed together with the pressure-resistant container. Thus, it is difficult to precisely inspect a minute leakage in a component part. Thus, there is a need to improve a technology that may inspect the leakage in units of systems including the plurality of pressure-resistant containers and the component parts, and at the same time, may diagnose the leakage of each pressure-resistant container or each component part and repair the pressure-resistant container or the component part.

SUMMARY

Embodiments of the present disclosure can solve problems occurring in the prior art while advantages achieved by the prior art are maintained intact. An embodiment of the present disclosure provides a leakage detecting device of a hydrogen storing system that may determine leakage in a plurality of storage tanks and may detect the leakage in consideration of passing of the storage tanks.

Another embodiment of the present disclosure provides a leakage detecting device of a hydrogen storing system that may determine leakage of a case that is a part of the detecting device in advance, thereby improving accuracy and reliability of leakage diagnosis of the hydrogen storing system.

Still another embodiment of the present disclosure provides a leakage detecting device of a hydrogen storing system that may determine and diagnose leakage of each of the storage tank, a component part, and the case.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, a leakage detecting device of a hydrogen storing system includes a case having an accommodation space formed therein, in which a plurality of storage tanks and a component part including a component that fills fuel into the plurality of storage tanks or supplies the fuel to a fuel consumer are accommodated, and a sensor part provided in the case and provided with a pressure sensor that measures a pressure of a fluid inside the accommodation space and a temperature sensor that detects a temperature thereof.

Embodiments of the present disclosure may further include a filling part that fills the accommodation space of the case with an inert gas and an overpressure preventing part that is connected to the case and discharges the fluid in the accommodation space.

Embodiments of the present disclosure may further include a memory that stores one or more instructions and at least one processor that is electrically connected to the component part, the sensor part, the filling part, and the overpressure preventing part and executes the one or more instructions stored in the memory. Further, the processor may, by executing the instructions, calculate a filling amount of a gas accommodated inside the case based on a signal received from the sensor part and determine whether the case, the storage tank, and the component part leak through a change in the filling amount of the case.

The processor may determine whether the case leaks through a change in a first filling amount that is the filling amount of the case when pressures of the storage tank and the component part belong to a first pressure range.

When a pressure range of which an upper limit that is smaller than a lower limit of the first pressure range is referred to as a second pressure range, and when it is determined that the case does not leak through the change in the first filling amount, the processor may determine whether the case leaks through a change in a second filling amount that is the filling amount of the case when the pressures of the storage tank and the component part belong to the second pressure range.

When it is determined that the case does not leak through the change in the second filling amount, the change in the filling amount of the case is referred to as a first leakage amount, and the processor may determine that the storage tank and the component part do not leak when the first leakage amount is smaller than a preset first reference range and may determine that at least one of the storage tank and the component part leaks when the first leakage amount is greater than or equal to the first reference range.

When the first leakage amount is greater than or equal to the first reference range, the processor may control the hydrogen storing system to close a tank valve that opens or closes the storage tank and decrease a pressure inside the component part.

A change in the filling amount of the case in a state in which the tank valve is closed and the pressure of the component part decreases may be referred to as a second leakage amount, a value obtained by subtracting the second leakage amount from the first leakage amount may be referred to as a third leakage amount, and the processor may determine that the storage tank and the component part leak when the second leakage amount is greater than or equal to a preset second reference range related to a passing amount of the storage tank and the third leakage amount is greater than or equal to a preset third reference range related to leakage of the component part.

The processor may determine that the storage tank leaks when the second leakage amount is greater than or equal to the second reference range and the third leakage amount is smaller than the third reference range.

The processor may determine that the component part leaks when the second leakage amount is smaller than the second reference range and the third leakage amount is greater than or equal to the third reference range.

BRIEF DESCRIPTION OF THE DRAWINGS

The above and other objects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, embodiments of the present disclosure will be described in detail with reference to the accompanying drawings.

First, embodiments described below are embodiments suitable for understanding technical features of a leakage detecting device of a hydrogen storing system according to the present disclosure. However, the present disclosure is not limited to the embodiments described below, the technical features of the present disclosure are not limited by the described embodiments, and various modifications may be made within the technical scope of the present disclosure.

Figure 1:
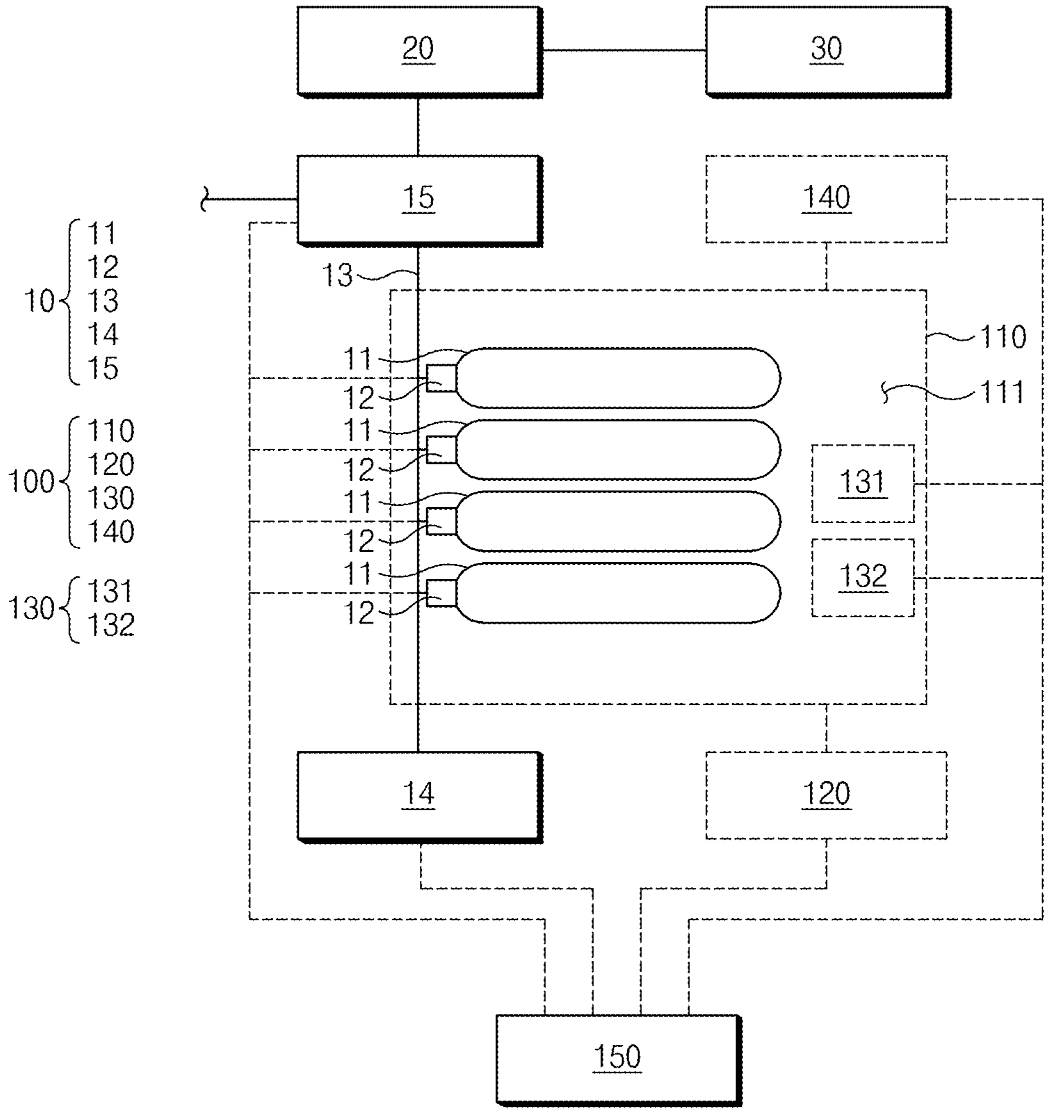
FIG. 1 is a schematic block diagram illustrating a configuration of a leakage detecting device in a hydrogen storing system according to an embodiment of the present disclosure.
Figure 2:
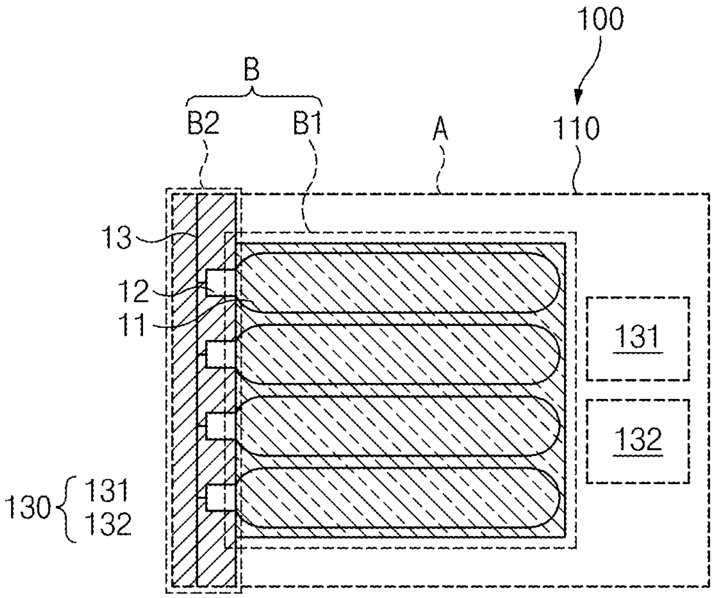
FIG. 2 is a view illustrating the leakage detecting device in the hydrogen storing system according to an embodiment of the present disclosure and illustrating a case and a component accommodated inside the case.
Figure 3:
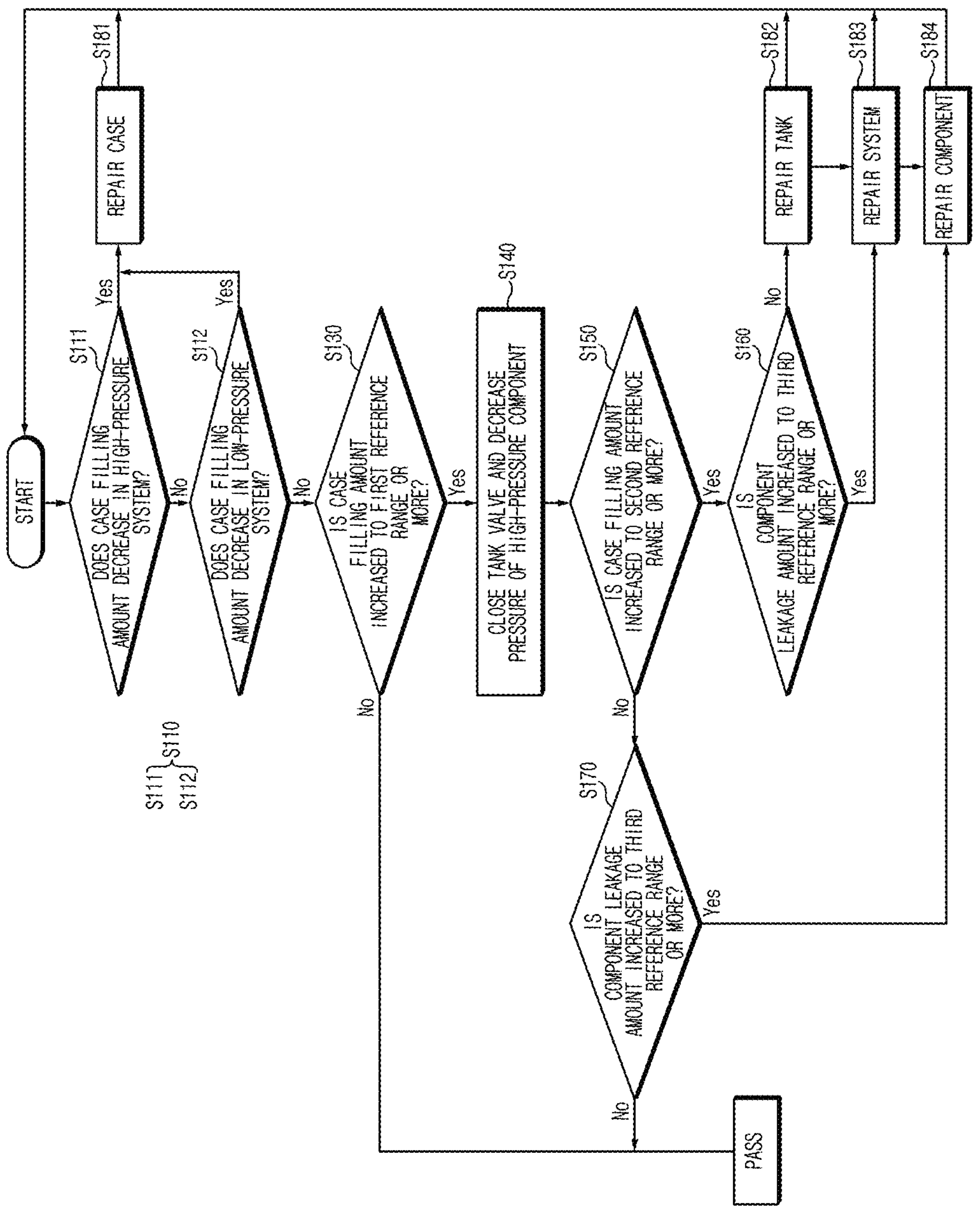
FIG. 3 is a flowchart of a leakage detecting method using the leakage detecting device in the hydrogen storing system according to an embodiment of the present disclosure.

FIG. 1 is a schematic block diagram illustrating a configuration of a leakage detecting device in a hydrogen storing system according to an embodiment of the present disclosure, FIG. 2 is a view illustrating the leakage detecting device in the hydrogen storing system according to an embodiment of the present disclosure and illustrating a case and a component accommodated inside the case, and FIG. 3 is a flowchart of a leakage detecting method using the leakage detecting device in the hydrogen storing system according to an embodiment of the present disclosure.

Embodiments of the present disclosure relate to a device for detecting whether a gas leaks from a hydrogen storing system 10 mounted on a vehicle. The hydrogen storing system 10 applied to the embodiment of the present disclosure may include a storage tank 11 that is a pressure-resistant container for storing hydrogen and components connected thereto.

In detail, the hydrogen storing system 10 may include a plurality of storage tanks 11 that store hydrogen, a filling port 14 that fills fuel in the storage tanks 11 or supplies the fuel to a fuel consumer, and a high-pressure pipe 13 that connects the filling port 14 and the plurality of storage tanks 11. The high-pressure pipe 13 may be connected to a fuel cell stack 20 and may supply high-pressure hydrogen stored in the storage tank 11 to the fuel cell stack 20. In detail, the high-pressure pipe 13 may be divided into a filling high-pressure pipe that connects the filling port 14 and the plurality of storage tanks 11 and a supply high-pressure pipe that connects the plurality of storage tanks 11 and the fuel cell stack 20.

Further, the hydrogen storing system 10 may further include a pressure reducing valve 15 that is connected to the high-pressure pipe 13, is connected between the storage tank 11 and the fuel cell stack 20, and reduces a pressure of the pipe. Alternatively, the hydrogen storing system 10 may further include an overpressure preventing valve on the high-pressure pipe 13, and the overpressure preventing valve may be provided to directly discharge an overpressure fluid when a pressure reduction by the pressure reducing valve 15 fails. A high-voltage battery 30 is connected to the fuel cell stack 20.

Among the hydrogen storing system 10, the plurality of storage tanks 11, a check valve connected to the plurality of storage tanks 11, and a part connected to the storage tank 11 as a part of the high-pressure pipe 13 may be accommodated in a case 110 which will be described below. Hereinafter, components of the hydrogen storing system 10, which are accommodated in the case 110, except for the storage tank 11 are referred to as component parts.

For example, referring to an example illustrated in FIG. 2, the component parts may include a tank valve 12, the high-pressure pipe 13, and the like. Area A of FIG. 2 indicates an accommodation space inside the case 110, area B1 indicates an area in which the storage tank 11 is provided, and area B2 indicates an area in which the component part is disposed. However, the numbers and arrangements of the storage tanks 11 and the component parts according to embodiments of the present disclosure are not limited to the illustrated example.

However, the hydrogen storing system 10 to which embodiments of the present disclosure are applied is not limited to the above-described configuration, and various configurations may be applied as long as the configurations are configured to supply the high-pressure hydrogen to the fuel cell stack 20.

Referring to FIGS. 1 to 3, a leakage detecting device 100 of the hydrogen storing system 10 includes the case 110 and a sensor part 130. Further, an embodiment of the present disclosure may further include a filling part 120 and an overpressure preventing part 140.

The case 110 is formed with the plurality of storage tanks 11 and an accommodation space 111 in which the component parts including components for filling the plurality of storage tanks 11 with hydrogen are accommodated.

In detail, the case 110 may be provided with the accommodation space 111 that is a sealed space, and the accommodation space 111 may be filled with an inert gas such as nitrogen. Here, the accommodation space 111 may be formed in a size (volume) in which the accommodation space 111 may be accommodated on the plurality of storage tanks 11 provided in the hydrogen storing system 10 together.

The case 110 may be filled with nitrogen at a higher pressure than the normal pressure under a lowest temperature condition (e.g., about −40° C.) among temperature conditions in which the storage tank 11 is used. Accordingly, outside air may be prevented from passing into the case 110.

Further, the case 110 may be made of a material of which a volume is not changed due to a temperature (e.g., about −40° C. to about 85° C.) or a pressure in an environment in which the storage tank 11 is used. More preferably, the case 110 may be made of a material of which a volume is not changed. Accordingly, the case 110 may have a constant density. In this case, the case 110 may have constant temperature and pressure curves, and accordingly, when the volume of the case 110 is identified, the filling amount of the case 110 may be calculated.

When the filling amount inside the case 110 continuously increases, it may be determined that a leakage occurs in the hydrogen storing system 10 (e.g., the storage tank 11 and the component parts) accommodated in the accommodation space 111. Further, when the filling amount inside the case 110 continuously decreases, it may be determined that a leakage occurs in the case 110.

The sensor part 130 is provided in the case 110 and is provided with a pressure sensor 131 that measures a pressure of a fluid inside the accommodation space 111 and a temperature sensor 132 that detects a temperature of the fluid.

In detail, the sensor part 130 is configured to detect the pressure and temperature inside the case 110, therefore, it may detect the filling amount inside the case 110, and as a result, it may detect the leakage of the case 110, the leakage of the component parts, and the leakage of the storage tank 11.

Since the pressure may vary depending on the temperature, the sensor part 130 according to an embodiment of the present disclosure may include both the temperature sensor 132 and the pressure sensor 131. Further, in an embodiment of the present disclosure, the temperature sensor 132 is included, and thus when a sudden temperature change is detected as in a fire, the sensor part 130 may serve as a device that is provided to inform a user of this situation and warns of danger in advance.

In this way, according to an embodiment of the present disclosure, when the leakage of the hydrogen storing system 10 is inspected, the case 110 that may be accommodated in a system unit including the storage tank 11 and the component part rather than a single hydrogen container is applied. Thus, the leakage may be determined in units of the plurality of storage tanks 11 and the leakage of the high-pressure component part may be determined together. Thus, the leakage may be detected in consideration of the passing of the storage tank 11.

Further, according to an embodiment of the present disclosure, since a change in the filling amount of the case 110 may be detected, the leakage of the case 110 that is a part of the detecting device may be determined, and accordingly, the leakage of the hydrogen storing system 10 may be more accurately determined.

Further, according to an embodiment of the present disclosure, an interior of the case 110 is filled with an inert gas, and thus an explosion-proof function of preventing fire and explosion due to a potential hydrogen leakage may be performed.

Further, according to an embodiment of the present disclosure, the case 110 that accommodates main components of the hydrogen storing system 10 is included. Thus, the hydrogen storing system 10 may be protected from an external environment, and the case 110 may be designed in a shape optimized for air resistance during driving, thereby improving aerodynamics.

The filling part 120 may be provided to fill the accommodation space 111 of the case 110 with an inert gas. The filling part 120 may be configured to fill the interior of the case 110 with nitrogen that is an inert gas and may be provided to supply the nitrogen in an appropriate amount.

For example, the filling part 120 may include a filling socket connected to an inlet of the case 110 and a check valve that prevents reverse flow when nitrogen is filled. When the accommodation space 111 is filled with nitrogen, the filling part 120 may supply nitrogen in an appropriate amount based on values measured by the pressure sensor 131 and the temperature sensor 132. A configuration of the filling part 120 is not limited to the above description, and the filling part 120 may be variously changed and implemented as long as an inert gas may be supplied to the case 110 in an appropriate amount.

The overpressure preventing part 140 may be connected to the case 110 and may be provided to discharge the fluid in the accommodation space 111.

For example, the overpressure preventing part 140 may be an overpressure preventing valve provided at an outlet of the case 110. When a pressure of a gas inside the case 110 is greater than a preset pressure or when a large amount of hydrogen is discharged from the storage tank 11, the overpressure preventing valve may be opened to discharge the gas inside the case 110 to the outside. Accordingly, an overpressure inside the case 110 may be prevented, and accordingly, damage to or destruction of the case 110 may be prevented.

In an embodiment of the present disclosure, the filling part 120 and the overpressure preventing part 140 are provided, and thus the leakage detecting device may be reusable and accordingly may be used semi-permanently.

The leakage detecting device 100 of the hydrogen storing system 10 according to an embodiment of the present disclosure may further include a memory that stores one or more instructions and at least one processor 150 that is electrically connected to the component part, the sensor part 130, the filling part 120, and the overpressure preventing part 140 and executes the one or more instructions stored in the memory.

The processor 150 may include one or more of a central processing unit (CPU), an application processor (AP), or a communication processor (CP). For example, the processor 150 may detect a temperature, a flow rate, and a pressure through various sensors provided in the leakage detecting device 100, and therefore may control the component part, the filling part 120, and the overpressure preventing part 140.

The memory is connected to the at least one processor 150 and stores the instructions. Here, the memory may include a volatile and/or non-volatile memory. Further, the memory may store commands or data related to at least one component of the leakage detecting device 100.

Further, the memory may store instructions for controlling the processor 150. Hereinafter, an operation performed by the processor 150 may be performed through execution of the instructions stored in the memory.

In addition, the processor 150 may execute the instructions to calculate the filling amount of the gas accommodated inside the case 110 based on a signal received from the sensor part 130 and determine whether the case 110, the storage tank 11, and the component part leak, through the change in the filling amount of the case 110.

In detail, the processor 150 may determine the filling amount of the case 110, which is the filling amount of the gas accommodated inside the case 110, and may determine whether the case 110 and the hydrogen storing system 10 leak, based on the determined filling amount of the case 110. Further, the processor 150 may control the filling part 120, the component part, and the like according to the filling amount of the case 110 and whether the hydrogen storing system 10 leaks.

For example, the processor 150 may receive a signal from the pressure sensor 131 to receive a pressure value inside the case 110 and may receive a signal from the temperature sensor 132 to receive a temperature value inside the case 110. The processor 150 may calculate the filling amount of the gas filled in the case 110, using the pressure and the temperature of the gas inside the case 110, which are detected by the sensor part 130. In this case, the case 110 may be made of a material of which a change in a volume is small, such as metal.

Whether the case 110 and the hydrogen storing system 10 leak may be determined through the change in the filling amount of the case 110, which is calculated in this manner. For example, when the filling amount of the case 110 continuously decreases in a predetermined environment, it may be determined that the case 110 leaks. Alternatively, for example, when the filling amount of the case 110 continuously increases in a predetermined environment, it may be determined that the storage tank 11 or the component part leaks. That is, whether the case 110 or the hydrogen storing system 10 leaks may be determined through an increase or a decrease in the filling amount of the case 110.

In this case, the processor 150 may receive the signals related to the pressure and the temperature from the sensor part 130 in real time, may calculate and store the filling amount inside the case 110, and thus may ensure stability of the hydrogen storing system 10.

Hereinafter, a method of determining whether the case 110, the storage tank 11, or the component part leaks using the leakage detecting device 100 of the hydrogen storing system 10 according to an embodiment of the present disclosure will be described with reference to the drawings illustrated in FIGS. 1 and 2 and the flowchart illustrated in FIG. 3.

First, the processor 150 may determine whether the case 110 leaks (S110). In an embodiment of the present disclosure, the determination on whether the case 110 leaks may be performed in a state in which the system is in a high-pressure state (S111) and in a state in which the system is in a low-pressure state (S112). For reference, hereinafter, for convenience of description, a term "system" refers to both the storage tank 11 and the component part together accommodated inside the case 110 as a part of the hydrogen storing system 10.

When the pressures of the storage tank 11 and the component part belong to a first pressure range, the processor 150 may determine whether the case 110 leaks through a change in a first filling amount that is the filling amount of the case 110 (S111).

Here, a case in which the pressures of the storage tank 11 and the component part belong to the first pressure range means a case in which hydrogen is stored in the storage tank 11 at a high pressure, and therefore, a pressure inside the high-pressure pipe 13 connected to the storage tank 11 and the filling port 14 is a high pressure. Further, in this case, the filling amount of the gas filled inside the case 110 is referred to as the first filling amount.

In this way, in a state in which the system is in a high-pressure state, the processor 150 may determine whether the filling amount of the gas inside the case 110 decreases.

When the filling amount (the first filling amount) of the gas inside the case 110 decreases in a state in which the storage tank 11 and the component part are in a high-pressure state, it may be determined that the gas leaks from the case 110. Thus, in this case, the case 110 may be repaired (S181). After the case 110 is repaired, the leak diagnosis may start again.

On the other hand, in a state in which the storage tank 11 and the component part are in a high-pressure state, when the filling amount of the gas inside the case 110 is constant or increases, that is, when it is determined that the filling amount of the case 110 does not decrease, a subsequent operation may be performed.

When a pressure range having an upper limit that is lower than a lower limit of the first pressure range is referred to as a second pressure range, and when it is determined that the case 110 does not leak through the change in the first filling amount, the processor 150 may determine whether the case 110 leaks through a change in a second filling amount that is the filling amount of the case 110 when the pressures of the storage tank 11 and the component part belong to the second pressure range (S112).

Here, a case in which the pressures of the storage tank 11 and the component part belong to the second pressure range means a case in which the hydrogen is stored in the storage tank 11 at a low pressure and a pressure inside the filling port 14 or the high-pressure pipe 13 is low. Further, in this case, the filling amount of the gas filled inside the case 110 is referred to as a second filling amount.

In this way, in a state in which the system is in a low-pressure state, the processor 150 may determine whether the filling amount of the gas inside the case 110 decreases. The reason why whether the case 110 leaks is determined in a state in which the system is in a low pressure is that it is difficult to accurately determine whether the case 110 leaks or the system leaks when a leakage amount of the case 110 and a leakage amount of the system are the same in a state in which the system is in a high pressure. When the system is in a low pressure, the leakage amount of the system decreases. Thus, when whether the case 110 leaks is determined once again under the low-pressure system, whether the case 110 leaks may be accurately determined.

In detail, even in a state in which the storage tank 11 and the component part are in a low-pressure state, when the filling amount (the second filling amount) of the gas inside the case 110 decreases, it may be determined that the gas leaks from the case 110. Thus, in this case, the case 110 may be repaired (S181). After the case 110 is repaired, the leak diagnosis may start again.

On the other hand, in a state in which the storage tank 11 and the component part are in a low-pressure state, when the second filling amount that is the filling amount of the case 110 does not decrease, it may be determined that the case 110 does not leak. Thereafter, a subsequent operation may be performed.

Hereinafter, in a state in which it is determined that the case 110 does not leak through a change in the second filling amount, the change in the filling amount of the case 110 is defined as a first leakage amount.

When the first leakage amount is smaller than a preset first reference range, the processor 150 may determine that the storage tank 11 and the component part do not leak. In this case, the processor 150 may determine that the hydrogen storing system 10 does not leak and may terminate a leakage detecting procedure. That is, in the case, the hydrogen storing system 10 may pass the leakage diagnosis (PASS).

Here, the first reference range may be set based on the standards of countries related to the leakage of the system, that is, the storage tank 11 and the component part and may be set based on the strictest standard among them.

On the other hand, when the first leakage amount is greater than or equal to the first reference range, the processor 150 may determine that at least one of the storage tank 11 and the component part leaks. In this case, the processor 150 may perform an operation of determining whether each of the system, the storage tank 11, and the component part leaks.

First, when the first leakage amount is greater than the first reference range, the processor 150 may control the hydrogen storing system 10 to close the tank valve 12 that opens or closes the storage tank 11 and decrease a pressure inside the component part.

In detail, when the first leakage amount is greater than or equal to the first reference range, the processor 150 may determine that the system leaks and first may determine whether the storage tank 11 leaks. The pressure of the component part should decrease as much as possible to determine whether the storage tank 11 leaks. A change in the filling amount of the gas inside the case 110, which is calculated after the tank valve 12 provided in the storage tank 11 is closed and the pressure of the component part decreases as much as possible, may be a hydrogen passing amount of the storage tank 11.

Hereinafter, the change in the filling amount of the case 110 in a state in which the tank valve 12 is closed and the pressure of the component part decreases is referred to as a second leakage amount, and a value obtained by subtracting the second leakage amount from the first leakage amount is referred to as a third leakage amount.

In this case, the processor 150 may determine that the storage tank 11 and the component part leak when the second leakage amount is greater than or equal to a preset second reference range related to the passing amount of the storage tank 11 and the third leakage amount is greater than or equal to a preset third reference range related to the leakage of the component part.

Here, the leakage of the storage tank 11 means hydrogen passing of the storage tank 11. The storage tank 11 used to store high-pressure hydrogen in a fuel cell vehicle allows hydrogen to pass due to the nature of the material. As an example, the storage tank 11 may be made of a material in which a carbon composite and a glass fiber are contained in a plastic liner, and thus, hydrogen may pass therethrough.

With this regard, European laws and the like limit an allowable hydrogen passing amount of a hydrogen storing container, and even in Korea, in the pressure-resistant container passing regulations of the "regulations on the safety of pressure-resistant containers for vehicles," it is stipulated that a hydrogen passing amount is not greater than the allowable hydrogen passing amount (6 cc/L/hr). The second reference range according to an embodiment of the present disclosure may be set in consideration of the laws and regulations related to the hydrogen passing amount, and for example, the second reference range may be set to a range of which an upper limit is set to 6 cc/L/hr.

Further, the "regulations on safety of pressure-resistant containers for vehicles" stipulate external leakage regulations for pressure-resistant containers, and the third reference range may be set to satisfy these regulations. For example, the third reference range may be set to a range of which an upper limit is 10 cc/L/hr. However, numerical values of the second reference range and the third reference range are not limited to the above description.

The second leakage amount may be the hydrogen passing amount of hydrogen passing from the storage tank 11 to the accommodation space 111 of the case 110 in a state in which the tank valve 12 is closed and the pressure of the component part decreases. Thus, the change, that is, an increase, in the filling amount inside the case 110 may be the second leakage amount.

The third leakage amount may be a value obtained by subtracting the second leakage amount from the first leakage amount. As described above, the first leakage amount means the change in the filling amount of the case 110 in a state in which the pressure of the component part does not decrease. Thus, the value obtained by subtracting the second leakage amount from the first leakage amount may be the third leakage amount that is a leakage amount of the component part.

When the second leakage amount is greater than or equal to the preset second reference range related to the passing amount of the storage tank 11, it may be determined that the storage tank 11 leaks. Further, when the third leakage amount is greater than or equal to the preset third reference range related to the leakage of the component part, it may be determined that the component part leaks.

Thus, when the second leakage amount is greater than or equal to the preset second reference range related to the passing amount of the storage tank 11 and when the third leakage amount is greater than or equal to the preset third reference range related to the leakage of the component part, the processor 150 may determine that the entire system including the storage tank 11 and the component part leaks (S160). In this case, an operator may repair the entire system (S183).

Meanwhile, when the second leakage amount is greater than or equal to the second reference range, and when the third leakage amount is smaller than the third reference range, the processor 150 may determine that the storage tank 11 leaks.

In detail, since the second leakage amount is greater than or equal to the second reference range, the processor 150 may determine that the storage tank 11 leaks. Further, since the third leakage amount is smaller than the third reference range, the processor 150 may determine that the component part does not leak. Thus, the processor 150 may determine that only the storage tank 11 leaks. In this case, the operator may repair only the storage tank 11 (S182).

Meanwhile, when the second leakage amount is smaller than the second reference range, and when the third leakage amount is greater than or equal to the third leakage amount, the processor 150 may determine that the component part leaks.

In detail, since the second leakage amount is smaller than the second reference range, the processor 150 may determine that the storage tank 11 does not leak. Further, since the third leakage amount is greater than or equal to the third reference range, the processor 150 may determine that the component part leaks. In this case, the operator may repair only the component part (S184). After the component part is repaired, the leakage diagnosis may start again.

On the other hand, when the second leakage amount is smaller than the second reference range, and when the third leakage amount is smaller than the third reference range (S170), the processor 150 may determine that the storage tank 11 and the component part do not leak. In this case, the processor 150 may determine that the hydrogen storing system 10 does not leak and thus terminate the leakage detecting procedure. That is, in the case, the hydrogen storing system 10 may pass the leakage diagnosis (PASS).

Through this process, whether leakage occurs may be determined in a system unit including the storage tank 11 and the component part, only the storage tank may be repaired when it is determined that only the storage tank 11 leaks, or only the component part may be repaired when it is determined that only the component part leaks. Accordingly, a repairing time may be shortened.

Further, the leakage may be detected in consideration of the hydrogen passing of the storage tank 11 through the above-described embodiments of the present disclosure.

In this way, according to an embodiment of the present disclosure, when whether a hydrogen storing system leaks is inspected, by applying a case that may accommodate a system unit including a storage tank and a component part rather than a single hydrogen container, whether there is leakage in a plurality of storage tanks may be determined, whether a high-pressure component part leaks may be together determined, and thus the leakage may be detected in consideration of passing of a storage tank.

Further, according to an embodiment of the present disclosure, since the change in the filling amount of the case may be detected, whether the case that is a part of the detecting device leaks may be determined, and accordingly, whether the hydrogen storing system leaks may be determined more accurately.

Further, according to an embodiment of the present disclosure, the interior of the case is filled with an inert gas, and thus an explosion-proof function of preventing fire and explosion due to a potential hydrogen leakage may be performed.

Further, according to an embodiment of the present disclosure, the case that accommodates the main components of the hydrogen storing system is included. Thus, the hydrogen storing system may be protected from an external environment, and the case may be designed in a shape optimized for air resistance during driving, thereby improving aerodynamics.

Although specific embodiments of the present disclosure have been described above, the spirit and scope of the present disclosure are not limited thereto, and those skilled in the art to which the present disclosure pertains may derive various modifications and changes without changing the subject matter of the present disclosure described in the appended claims.

What is claimed is:

1. A device for detecting a leak in a hydrogen storing system, the device comprising:

a case having an accommodation space defined, wherein the accommodation space is configured to accommodate a plurality of storage tanks and a component part therein, the component part comprising a component configured to fill a fuel into the plurality of storage tanks or supply the fuel to a fuel consumer;

a sensor part disposed in the case, the sensor part comprising a pressure sensor configured to measure a pressure of a fluid inside the accommodation space and a temperature sensor configured to detect a temperature of the fluid;

one or more processors; and a storage device storing a program to be executed by the one or more processors, the program including instructions to:

calculate a filling amount of a gas accommodated inside the case based on a signal received from the sensor part; and determine whether the case, the plurality of storage tanks, or the component part leaks based on a change in the filling amount of the gas accommodated inside the case.

2. The device of claim 1, further comprising:

a filling part configured to fill the accommodation space of the case with an inert gas; and an overpressure preventing part connected to the case and configured to discharge the fluid from inside the accommodation space.

3. The device of claim 2, wherein the program further includes instructions to determine whether the case leaks based on a change in a first filling amount, the first filling amount being the filling amount of the case in a state in which pressures of the plurality of storage tanks and the component part belong to a first pressure range.

4. The device of claim 3, wherein, in response to a determination that the case does not leak based on the change in the first filling amount, the program further includes instructions to determine whether the case leaks through a change in a second filling amount, the second filling amount being the filling amount of the case in a state in which the pressures of the plurality of storage tanks and the component part belong to a second pressure range, the second pressure range being a pressure range of which an upper limit is smaller than a lower limit of the first pressure range.

5. The device of claim 4, wherein, in response to a determination that the case does not leak through the change in the second filling amount, the program further includes instructions to:

determine that the plurality of storage tanks and the component part do not leak based on a first leakage amount being smaller than a preset first reference range, the first leakage amount being the change in the filling amount of the case; and determine that the plurality of storage tanks or the component part leaks based on the first leakage amount being greater than or equal to the first reference range.

6. The device of claim 5, wherein, in a case in which the first leakage amount is greater than or equal to the first reference range, the program further includes instructions to control the hydrogen storing system to close a tank valve configured to open or close a storage tank of the plurality of storage tanks and decrease a pressure inside the component part.

7. The device of claim 6, wherein the program further includes instructions to:

determine whether a second leakage amount is greater than or equal to a preset second reference range related to a passing amount of the plurality of storage tanks, the second leakage amount being a change in the filling amount of the case in a state in which the tank valve is closed and the pressure of the component part decreases;

determine whether a third leakage amount is greater than or equal to a preset third reference range related to leakage of the component part, the third leakage amount being a value obtained by subtracting the second leakage amount from the first leakage amount; and determine that the plurality of storage tanks or the component part leak in a case in which the second leakage amount is greater than or equal to the preset second reference range and the third leakage amount is greater than or equal to the preset third reference range.

8. The device of claim 7, wherein the program further includes instructions to determine that the plurality of storage tanks leaks in a case in which the second leakage amount is greater than or equal to the second reference range and the third leakage amount is smaller than the third reference range.

9. The device of claim 7, wherein the program further includes instructions to determine that the component part leaks in a case in which the second leakage amount is smaller than the second reference range and the third leakage amount is greater than or equal to the third reference range.

10. A method for detecting a leak in a hydrogen storing system comprising a case and a storage tank and a component part accommodated in an accommodation space of the case, the method comprising:

in a state in which the storage tank and the component part are in a high-pressure state, determining that the case leaks based on a decrease in a filling amount of a gas inside the case;

in response to there being no decrease in the filling amount of the gas inside the case in the high-pressure state, determining that the case leaks based on a decrease in the filling amount of the gas inside the case in a state in which the storage tank and the component part are in a low-pressure state;

in response to there being no decrease in the filling amount of the gas inside the case in both the high-pressure state and the low-pressure state, determining that the case does not leak;

following a determination that the case does not leak, determining whether a first leakage amount is greater than or equal to a preset first reference range, the first leakage amount being a change in the filling amount of the gas inside the case;

in response to a determination that the first leakage amount is smaller than the first reference range, determining that both the storage tank and the component part do not leak;

in response to a determination that the first leakage amount is greater than or equal to the first reference range, controlling the hydrogen storing system to close a tank valve that opens or closes the storage tank and decrease a pressure inside the component part;

determining whether a second leakage amount is greater than or equal to a preset second reference range, the second leakage amount being the change in the filling amount of the case in a state in which the tank valve is closed and the pressure of the component part is decreased;

determining whether a third leakage amount is greater than or equal to a preset third reference range, the third leakage amount being a value obtained by subtracting the second leakage amount from the first leakage amount;

in response to a determination that the second leakage amount is smaller than the second reference range and a determination that the third leakage amount is smaller than the third reference range, determining that neither the storage tank nor the component part leaks; and in response to a determination that the second leakage amount is greater than or equal to the second reference range and a determination that the third leakage amount is greater than or equal to the third reference range, determining that the storage tank and the component part both leak.

11. The method of claim 10, wherein, in response to a determination that the second leakage amount is greater than or equal to the second reference range and a determination that the third leakage amount is smaller than the third reference range, determining that the storage tank leaks.

12. The method of claim 10, wherein, in response to a determination that the second leakage amount is smaller than the second reference range and a determination that the third leakage amount is greater than or equal to the third reference range, determining that the component part leaks.

13. The method of claim 10, wherein the hydrogen storing system further comprises a sensor part disposed in the case, the sensor part comprising a pressure sensor configured to measure a pressure of a fluid inside the accommodation space and a temperature sensor configured to detect a temperature of the fluid.

14. The method of claim 13, wherein the hydrogen storing system further comprises:

a filling part configured to fill the accommodation space of the case with an inert gas; and an overpressure preventing part connected to the case and configured to discharge the fluid from inside the accommodation space.

15. A method for detecting a leak in a hydrogen storing system comprising a case and a storage tank and a component part accommodated in an accommodation space of the case, the method comprising:

in a state in which the storage tank and the component part are in a high-pressure state, determining that the case leaks based on a decrease in a filling amount of a gas inside the case;

in response to there being no decrease in the filling amount of the gas inside the case in the high-pressure state, determining that the case leaks based on a decrease in the filling amount of the gas inside the case in a state in which the storage tank and the component part are in a low-pressure state;

in response to there being no decrease in the filling amount of the gas inside the case in both the high-pressure state and the low-pressure state, determining that the case does not leak;

following a determination that the case does not leak, determining whether a first leakage amount is greater than or equal to a preset first reference range, the first leakage amount being a change in the filling amount of the gas inside the case;

in response to a determination that the first leakage amount is smaller than the first reference range, determining that both the storage tank and the component part do not leak;

in response to a determination that the first leakage amount is greater than or equal to the first reference range, controlling the hydrogen storing system to close a tank valve that opens or closes the storage tank and decrease a pressure inside the component part;

determining whether a second leakage amount is greater than or equal to a preset second reference range, the second leakage amount being the change in the filling amount of the case in a state in which the tank valve is closed and the pressure of the component part is decreased;

determining whether a third leakage amount is greater than or equal to a preset third reference range, the third leakage amount being a value obtained by subtracting the second leakage amount from the first leakage amount;

in response to a determination that the second leakage amount is smaller than the second reference range and a determination that the third leakage amount is smaller than the third reference range, determining that neither the storage tank nor the component part leaks;

in response to a determination that the second leakage amount is greater than or equal to the second reference range and a determination that the third leakage amount is greater than or equal to the third reference range, determining that the storage tank and the component part both leak;

in response to a determination that the second leakage amount is greater than or equal to the second reference range and a determination that the third leakage amount is smaller than the third reference range, determining that the storage tank leaks; and in response to a determination that the second leakage amount is smaller than the second reference range and a determination that the third leakage amount is greater than or equal to the third reference range, determining that the component part leaks.

16. The method of claim 15, wherein the hydrogen storing system further comprises a sensor part disposed in the case, the sensor part comprising a pressure sensor configured to measure a pressure of a fluid inside the accommodation space and a temperature sensor configured to detect a temperature of the fluid.

17. The method of claim 16, wherein the hydrogen storing system further comprises:

a filling part configured to fill the accommodation space of the case with an inert gas; and an overpressure preventing part connected to the case and configured to discharge the fluid from inside the accommodation space.

* * * * *